(12) United States Patent
Nishida et al.

(10) Patent No.: US 7,040,117 B2
(45) Date of Patent: *May 9, 2006

(54) GAS-LIQUID SEPARATOR AND EJECTOR REFRIGERANT CYCLE USING THE SAME

(75) Inventors: Shin Nishida, Anjo (JP); Yoshitaka Tomatsu, Chiryu (JP); Keiichi Kitamura, Handa (JP)

(73) Assignee: DENSO Corporation, Kariya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/431,713

(22) Filed: May 8, 2003

(65) Prior Publication Data

US 2003/0209030 A1 Nov. 13, 2003

(30) Foreign Application Priority Data

May 13, 2002 (JP) .............................. 2002-136953

(51) Int. Cl.
*F25B 1/06* (2006.01)
*F25B 43/00* (2006.01)

(52) U.S. Cl. .............................. 62/500; 62/503; 62/512

(58) Field of Classification Search .................. 62/500, 62/512, 238.6, 244, 527, 191, 503, 528
See application file for complete search history.

(56) References Cited

U.S. PATENT DOCUMENTS

| | | | | |
|---|---|---|---|---|
| 3,701,264 A | * | 10/1972 | Newton | 62/191 |
| 5,056,329 A | * | 10/1991 | Wilkinson | 62/197 |
| 5,813,249 A | * | 9/1998 | Matsuo et al. | 62/509 |
| 6,155,075 A | * | 12/2000 | Hanson et al. | 62/512 |
| 6,477,857 B1 | * | 11/2002 | Takeuchi et al. | 62/500 |

FOREIGN PATENT DOCUMENTS

| | | |
|---|---|---|
| JP | 59-15779 | 1/1984 |
| JP | 6-26718 | 2/1994 |
| JP | 06137695 A * | 5/1994 |

* cited by examiner

*Primary Examiner*—Chen Wen Jiang
(74) *Attorney, Agent, or Firm*—Harness, Dickey & Pierce, PLC

(57) ABSTRACT

In an ejector refrigerant cycle, even if refrigerant is super-heated in an evaporator, super-heated gas refrigerant does not directly flow into a gas-liquid separator, so that boiling of refrigerant does not occur in the gas-liquid separator due to evaporation of refrigerant in the gas-liquid separator. When an equivalent inner diameter (D) of a tank body of the gas-liquid separator is set in a range of 2 cm–6 cm, and when a ratio of a vertical dimension (H) of the tank body to the equivalent inner diameter (D) thereof is larger than 1, a wall thickness of the tank body can be reduced while gas-liquid separation performance in the gas-liquid separator can be improved.

28 Claims, 9 Drawing Sheets

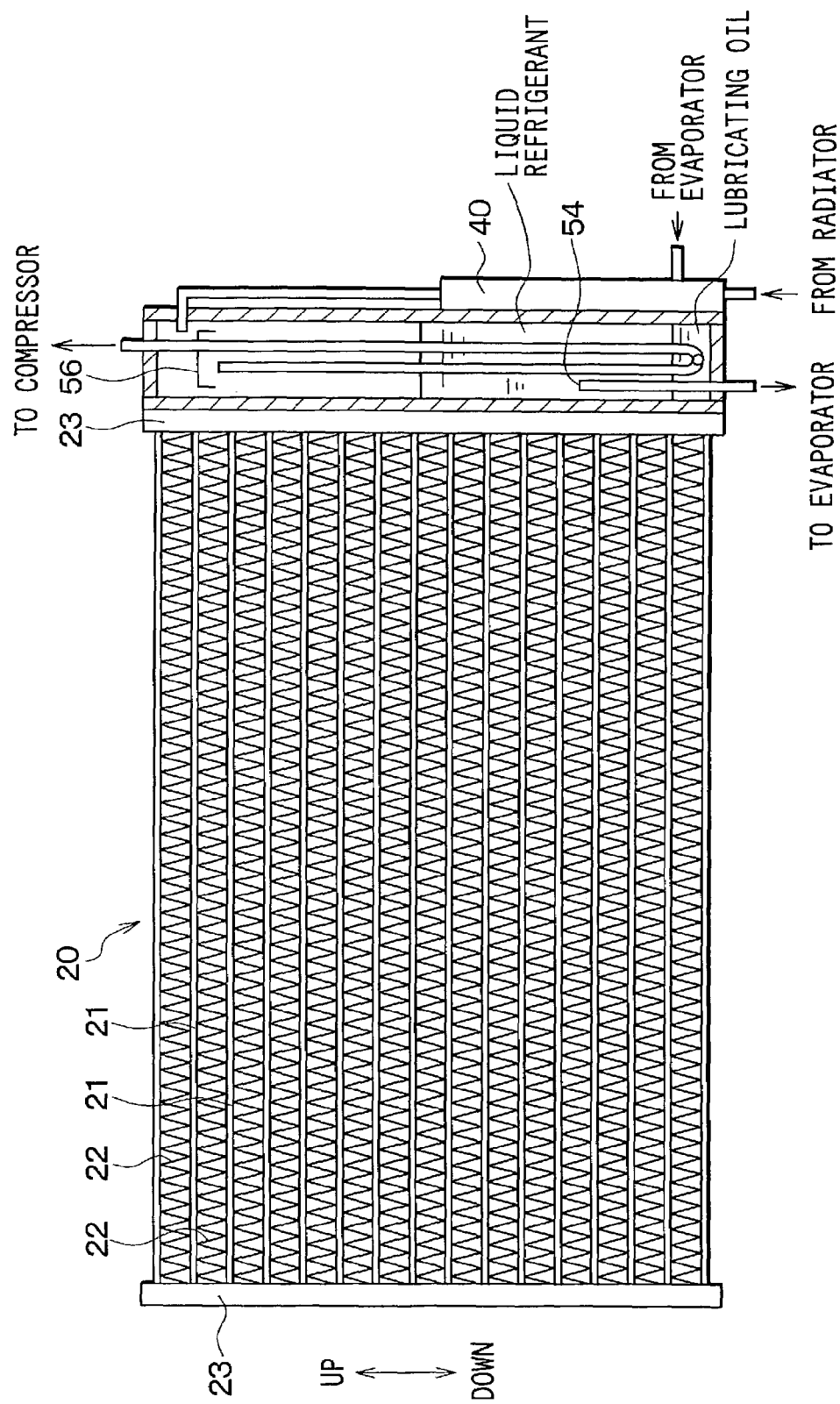

FIG. 3A
FIG. 3B
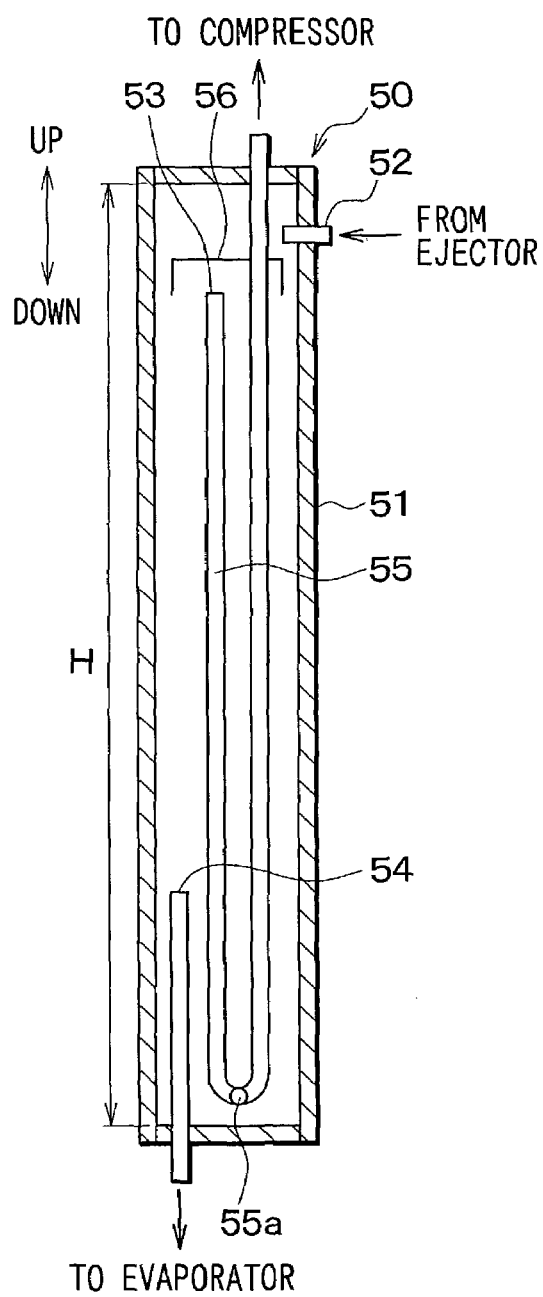
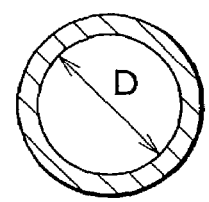

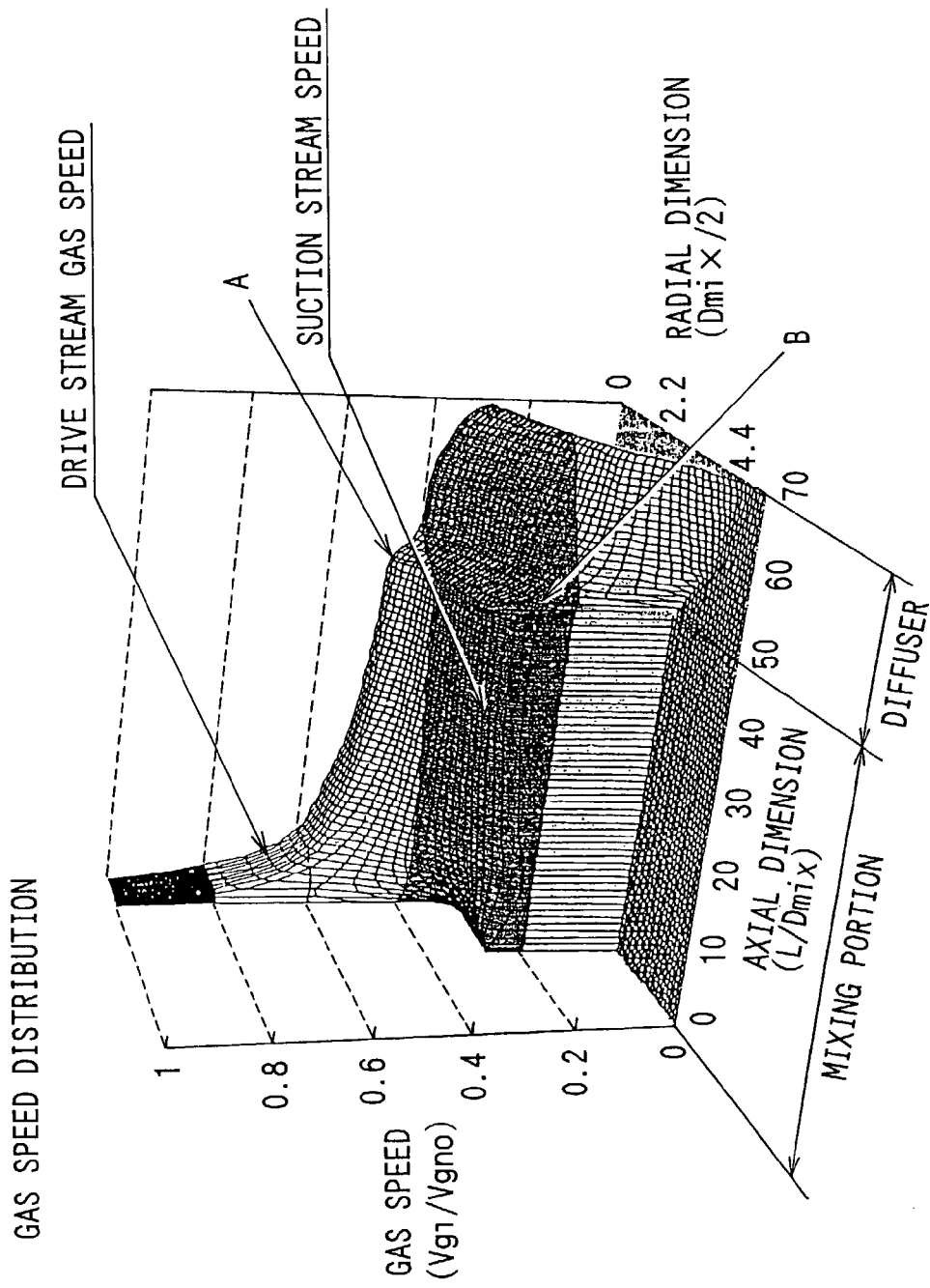

GAS-LIQUID SEPARATOR AND EJECTOR REFRIGERANT CYCLE USING THE SAME

CROSS-REFERENCE TO RELATED APPLICATION

This application is related to and claims priority from Japanese Patent Application No. 2002-136953 filed on May 13, 2002, the content of which is hereby incorporated by reference.

BACKGROUND OF THE INVENTION

1. Field of the Invention

The present invention relates to a gas-liquid separator and an ejector refrigerant cycle using the gas-liquid separator. The gas-liquid separator can be suitably used for a vapor-compression refrigerant cycle system.

2. Description of Related Art

In a vapor-compression refrigerant cycle system, a gas-liquid separator for storing excess refrigerant is provided at a high pressure side or a low pressure side so as to compensate thermal-load variation. The gas-liquid separator separates refrigerant into gas refrigerant and liquid refrigerant. Specifically, when the gas-liquid separator is provided at the low pressure side, the gas refrigerant in the gas-liquid separator is supplied to a suction side of a compressor while the liquid refrigerant is stored in the gas-liquid separator. At this time, the super-heated gas refrigerant from an evaporator flows into the gas-liquid separator, and is heat-exchanged with the liquid refrigerant stored in the gas-liquid separator. Therefore, the liquid refrigerant stored in the gas-liquid separator is evaporated, so that saturated gas refrigerant without super-heating is supplied to the compressor. Further, because the liquid refrigerant in the gas-liquid separator is evaporated to cause violent bubbles on its liquid surface, the liquid refrigerant may be supplied to the suction side of the compressor. This trouble is generally prevented by increasing a liquid surface area, that is, a cross-section area of a tank body of the gas-liquid separator.

However, as the cross-section area of the tank body, that is, an inner radial dimension of the tank body increases, stress applied to the tank body is increased, and pressure resistance of the tank body is reduced. Therefore, the pressure resistance of the tank body is required to be sufficiently ensured by increasing of its wall thickness or the like. Accordingly, the weight and the size of the gas-liquid separator increase, and its production cost also increases.

SUMMARY OF THE INVENTION

It is an object of the present invention to reduce the weight and the size of a gas-liquid separator for a refrigerant cycle, while gas-liquid separation performance of the gas-liquid separator can be improved.

It is another object of the present invention to provide an ejector refrigerant cycle having the gas-liquid separator.

In a gas-liquid separator for a refrigerant cycle with a compressor, a radiator, an evaporator and an ejector, a tank body is provided for separating refrigerant flowing from the ejector into gas refrigerant and liquid refrigerant. The tank body is disposed such that the gas refrigerant in the tank body is supplied to a suction side of the compressor and the liquid refrigerant in the tank body is supplied toward the evaporator. Further, the tank body has an equivalent inner diameter (D) that is set in a range of 2 cm–6 cm, and a ratio of a vertical dimension (H) of the tank body to the equivalent inner diameter (D) thereof is larger than 1. In the refrigerant cycle having the ejector for decompressing refrigerant from the radiator, even when refrigerant is super-heated in the evaporator, the super-heated gas refrigerant is heat-exchanged with liquid refrigerant in the ejector, and generally becomes saturated gas refrigerant in the ejector. Therefore, super-heated gas refrigerant from the evaporator can be prevented from flowing directly into the gas-liquid separator. Thus, boiling can be prevented from occurring in the gas-liquid separator due to evaporation of liquid refrigerant in the gas-liquid separator. Therefore, the vertical dimension H of the gas-liquid separator can be made larger than the equivalent inner diameter D thereof. That is, the ratio of the vertical dimension (H) of the tank body to the equivalent inner diameter (D) thereof can be set larger than 1. According to the present invention, because the equivalent inner diameter (D) of the tank body is set in the range of 2 cm–6 cm, the gas-liquid separation performance can be improved while the weight and the size of the gas-liquid separator can be effectively reduced. For example, the tank body substantially has a cylindrical shape.

According to the present invention, the ratio of the vertical dimension (H) of the tank body to the equivalent inner diameter (D) thereof can be suitably set at a value larger than 1, based on operation state of the refrigerant cycle. For example, the ratio of the vertical dimension (H) of the tank body to the equivalent inner diameter (D) thereof can be set to be equal to or larger than 6.66. Alternatively, the ratio of the vertical dimension (H) of the tank body to the equivalent inner diameter (D) thereof can be equal to or smaller than 13.3. Alternatively, the ratio of the vertical dimension (H) of the tank body to the equivalent inner diameter (D) thereof can be set in a range between 6.66 and 13.3. Alternatively, the ratio of the vertical dimension (H) of the tank body to the equivalent inner diameter (D) thereof can be set to be equal to or larger than 1.41. Alternatively, the ratio of the vertical dimension (H) of the tank body to the equivalent inner diameter (D) thereof can be set smaller than 5.66. Alternatively, the ratio of the vertical dimension (H) of the tank body to the equivalent inner diameter (D) thereof can be set in a range between 1.41 and 5.66. Alternatively, the ratio of the vertical dimension (H) of the tank body to the equivalent inner diameter (D) thereof can be set to be equal to or larger than 4.86.

Further, in the refrigerant cycle, the tank body can be integrated to the radiator, or can be integrated to the ejector. In addition, as the refrigerant, any one of carbon dioxide, natural refrigerant, HFC group refrigerant and HFE group refrigerant, or a mixture of thereof can be used.

BRIEF DESCRIPTION OF THE DRAWINGS

Additional objects and advantages of the present invention will be more readily apparent from the following detailed description of a preferred embodiment when taken together with the accompanying drawings, in which:

FIG. 2 is a schematic diagram showing an integrated structure of the ejector, a radiator and a gas-liquid separator, according to the preferred embodiments;

FIG. 3A is a longitudinal sectional view showing a gas-liquid separator according to a first embodiment of the present invention, and FIG. 3B is a lateral sectional view showing the gas-liquid separator according to the first embodiment;

FIG. 4 is a three-dimensional characteristic graph showing a relationship between a gas refrigerant speed, a radial dimension and an axial dimension of a refrigerant passage of the ejector, in a range between a refrigerant outlet of a nozzle of the ejector and a refrigerant outlet of a diffuser of the ejector;

DETAILED DESCRIPTION OF THE PREFERRED EMBODIMENTS

Preferred embodiments of the present invention will be described hereinafter with reference to the appended drawings.

(First Embodiment)

Figure 1:
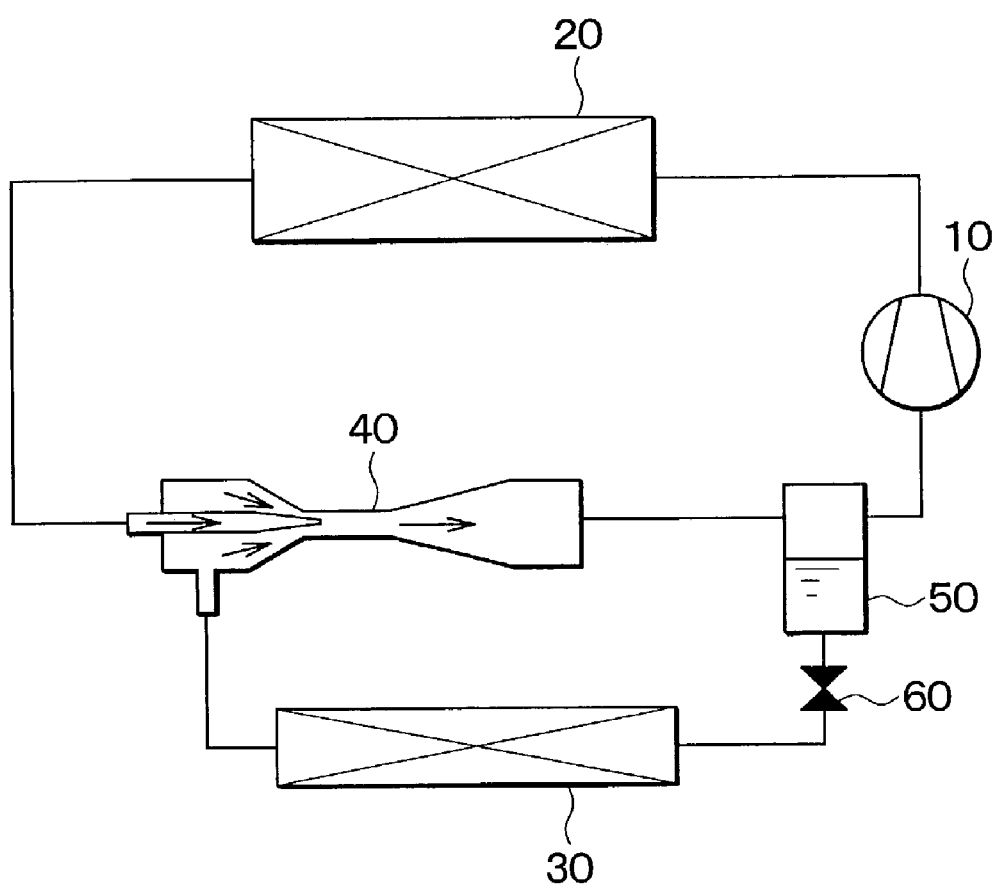
FIG. 1 is a schematic diagram showing a vapor-compression refrigerant cycle system with an ejector according to preferred embodiments of the present invention.

In the first embodiment, as shown in FIG. 1, an ejector refrigerant cycle of the present invention is typically used for a vehicle air conditioner. A compressor 10 is a variable displacement compressor for sucking and compressing refrigerant by using motive power from a vehicle engine. A radiator 20 is a high-pressure heat exchanger, and radiates heat of refrigerant by performing heat exchange between outside air and refrigerant discharged from the compressor 10. In the first embodiment, although carbon dioxide is typically used as the refrigerant, fleon (e.g., R404, R134a) can be used as the refrigerant. When fleon is used as the refrigerant, refrigerant is condensed in the radiator 20. However, when carbon dioxide is used as the refrigerant, refrigerant pressure at a high pressure side is equal to or higher than the critical pressure of the refrigerant. Therefore, when carbon dioxide is used as the refrigerant, the refrigerant is not condensed in the radiator 20, and the temperature of refrigerant reduces from a refrigerant inlet to a refrigerant outlet in the radiator 20.

An evaporator 30 is a low-pressure heat exchanger, and performs heat exchange between liquid refrigerant and air to be blown into a passenger compartment, so that the liquid refrigerant is evaporated by absorbing heat from air passing through the evaporator 30. An ejector 40 has a decompression function and a pumping function. The ejector 40 includes a nozzle, and a pressure-increasing portion that is constructed with a mixing portion and a diffuser. The nozzle decompresses and expands refrigerant from the radiator 20. The mixing portion and the diffuser increase pressure of refrigerant to be sucked to the compressor 10 by converting the expansion energy of the refrigerant from the nozzle to the pressure energy of the refrigerant, while sucking gas refrigerant from the evaporator 30 by the jet flow of refrigerant from the nozzle. Here, the nozzle is the Lavel nozzle "(refer to Fluid Engineering published by Tokyo University Publication)" which includes a throttle having a smallest passage area in its refrigerant passage. In the first embodiment, the Laval nozzle is adopted to accelerate refrigerant injected from the nozzle equal to or higher than the sound velocity.

The gas-liquid separator 50 separates refrigerant, flowing out from the ejector 40, into the gas refrigerant and liquid refrigerant, and stores the separated liquid refrigerant therein. A gas refrigerant outlet of the gas-liquid separator 50 is connected to the suction side of the compressor 10, and a liquid refrigerant outlet of the gas-liquid separator 50 is connected to a refrigerant inlet side of the evaporator 30. A throttle 60 decompresses refrigerant to be supplied to the evaporator 30 from the gas-liquid separator 50. In the first embodiment, a fixed throttle, a capillary tube or the like can be adopted as the throttle 60.

As shown in FIG. 2, the gas-liquid separator 50 is integrally bonded to the radiator 20 and the ejector 40 by brazing, while being disposed adjacent to the radiator 20. Specifically, the brazing is performed with hard solder (brazing material) having a melting point equal to or higher than 450° C., or with soft solder (brazing material) having a melting point lower than 450° C. The radiator 20 includes plural tubes 21 in which refrigerant flows, fins 22 connected to outer surfaces of the tubes 21, two headers 23 connected to longitudinal ends of each tube 21, and the like. The fins 22 are provided for increasing a heat transfer area between outside air and the radiator 20. Each header 23, having a substantially circular cylindrical shape, communicates with the tubes 21. In the first embodiment, the gas-liquid separator 50 is connected to one of the headers 23.

FIGS. 3A and 3B show the single structure of the gas-liquid separator 50. As shown in FIGS. 3A, 3B, the gas-liquid separator 50 includes a tank body 51 for storing refrigerant therein, and for separating the refrigerant into gas refrigerant and liquid refrigerant. The tank body 51 is formed into a substantially circular cylindrical shape. The tank body 51 has a refrigerant inlet 52, a gas refrigerant outlet 53 and a liquid refrigerant outlet 54. Refrigerant from the ejector 40 flows into the tank body 51 through the refrigerant inlet 52. Further, the separated gas refrigerant flows out from the tank body 51 through the gas refrigerant outlet 53, and the separated liquid refrigerant flows out there from through the liquid refrigerant outlet 54. The tank body 51 is made of a material having high working performance, and is made of an aluminum alloy in the first embodiment. The tank body 51 has a longitudinally extending cylindrical shape. In this case, a ratio (H/D) of a vertical inner dimension H of the tank body 51 to an equivalent inner diameter D thereof is larger than 1. For example, the ratio (H/D) is in a range between 6.66 and 13.3. That is, $6.66 \leq H/D \leq 13.3$. Here, the equivalent inner diameter D is an inner diameter corresponding to a round sectional area of the tank body 51.

In the tank body 51, the liquid refrigerant outlet 54 is opened at a position lower than the refrigerant inlet 52, and the gas refrigerant outlet 53 is opened at a position higher than the liquid refrigerant outlet 54. A pipe 55 connected to the gas refrigerant outlet 53 is bent in a U-shape to form a U-shaped portion, and the U-shaped portion is positioned under the liquid refrigerant outlet 54. Further, the pipe 55 has an oil return hole 55a in the U-shaped portion at its lowest portion (bent portion). Through the oil return hole 55a, lubricating oil in the gas-liquid separator 50 is returned to the compressor 10.

A partition plate 56 is disposed in a cup shape to cover an upper side of the gas refrigerant outlet 53. The partition plate 56 prevents refrigerant, supplied into the tank body 51 through the refrigerant inlet 52, from directly flowing into the gas refrigerant outlet 53.

Next, operation of the ejector refrigerant cycle and a vehicle air conditioner with the ejector refrigerant cycle will be described. The compressor 10 sucks gas refrigerant from the gas-liquid separator 50, and discharges compressed refrigerant to the radiator 20. Then, the radiator 20 cools the refrigerant discharged from the compressor 10, and the cooled refrigerant flows to the ejector 40. The refrigerant discharged from the radiator 20 is decompressed in the nozzle while being jetted at a high speed in the nozzle of the ejector 40. At this time, the ejector 40 sucks gas refrigerant evaporated in the evaporator 30 by this refrigerant injection from the nozzle.

As shown in FIG. 4, in the mixing portion of the ejector 40, a driving stream of refrigerant injected from the nozzle and a suction stream of refrigerant sucked into the ejector 40 from evaporator 30 are mixed. That is, the driving stream and the suction stream are mixed in the mixing portion so that their momentum sum is conserved. Therefore, refrigerant pressure (static pressure) is increased in the mixing portion of the ejector 40.

In the diffuser of the ejector 40, since a refrigerant passage sectional area is gradually increased, speed energy (dynamic pressure energy) of refrigerant is converted to pressure energy (static pressure energy). Thus, in the ejector 40, refrigerant pressure is increased in both of the mixing portion and the diffuser. That is, in the theoretical ejector 40, refrigerant pressure is increased in the mixing portion so that the momentum sum of the drive stream and the suction stream is conserved, and refrigerant pressure is increased in the diffuser so that total energy is conserved.

In FIG. 4, a speed of gas refrigerant injected from the nozzle is set at 1, and an axial dimension is a dimension from a refrigerant outlet of the nozzle. Further, a radial dimension is a dimension from an axial line of the ejector 40 in a radial direction. As shown in FIG. 4, speed reduction of drive gas refrigerant jetted from the nozzle is substantially completed at the refrigerant outlet of the mixing portion as indicated by the arrow A. Further, suction gas refrigerant is sufficiently accelerated at the refrigerant outlet of the mixing portion as indicated by the arrow B.

On the other hand, because refrigerant in the evaporator 30 is sucked into the ejector 40, liquid refrigerant flows from the gas-liquid separator 50 into the evaporator 30. In the evaporator 30, the liquid refrigerant absorbs heat from air to be blown into the passenger compartment, and is evaporated. Then, as described above, refrigerant (suction stream) sucked from the evaporator 30 and refrigerant (drive stream) injected from the nozzle are mixed in the mixing portion, and the dynamic pressure of the refrigerant is converted to the static pressure of the refrigerant in the diffuser. Thereafter, refrigerant of the ejector 40 is discharged to the gas-liquid separator 50.

Next, operational effects according to the first embodiment will be described. When a cooling load of the vehicle air conditioner increases, a super-heating degree of refrigerant in the evaporator 30 is increased, and refrigerant may be in a supper-heated state at an outlet of the evaporator 30. In this case, gas refrigerant sucked into the ejector 40 from the evaporator 30 is also in the super-heated state. On the other hand, refrigerant flowing into the nozzle is decompressed and expanded therein in substantially iso-entropy, so that a speed of the refrigerant is increased at a throat portion of the nozzle. Therefore, at an outlet area of the nozzle, especially downstream from the throat portion thereof, since liquid refrigerant is boiled (evaporated), droplets of liquid refrigerant are fined.

Therefore, the suction stream of super-heated gas refrigerant contacts the fined droplets of liquid refrigerant having an increased surface area, and the drive stream and the suction stream are quickly heat-exchanged with each other in the mixing portion of the ejector 40. Thus, at a refrigerant outlet of the ejector 40, the super-heated gas refrigerant disappears, and saturated gas refrigerant and fined droplet refrigerant are mixed in a gas-liquid state. Otherwise, only saturated gas refrigerant is discharged from the refrigerant outlet of the ejector 40. Accordingly, even if refrigerant is super-heated in the evaporator 30, the super-heated gas refrigerant does not directly flow into the gas-liquid separator 50. Therefore, boiling does not occur in the gas-liquid separator 50 due to evaporation of liquid refrigerant in the gas-liquid separator 50. Thus, the vertical dimension H of the tank body 51 in a vertical direction can be set larger than the equivalent inner diameter D of the tank body 51. That is, the tank body 51 can be formed into a vertically extending cylindrical shape. Even in this case, liquid refrigerant can be prevented from being supplied to the suction side of the compressor 10 due to boiling of refrigerant.

Furthermore, because the equivalent inner diameter D of the tank body 51 can be made smaller, stress applied to the tank body 51 due to inner pressure can be made smaller, thereby reducing the wall thickness of the tank body 51. Accordingly, production cost, weight and the size of the gas-liquid separator 50 can be reduced. On the other hand, when the equivalent inner diameter D of the tank body 51 is set smaller than a predetermined dimension (e.g., 2 cm in FIG. 5), the gas-liquid separation performance in the gas-liquid separator 50 is greatly reduced.

In a refrigerant cycle using carbon dioxide as refrigerant, when operation of the refrigerant cycle is stopped in the summer, a pressure about 100 atmospheric pressure or higher than 100 atmospheric pressure is applied to an inner portion of the gas-liquid separator 50. Therefore, very large stress is applied to the tank body 51 due to the inner pressure.

Figure 5:
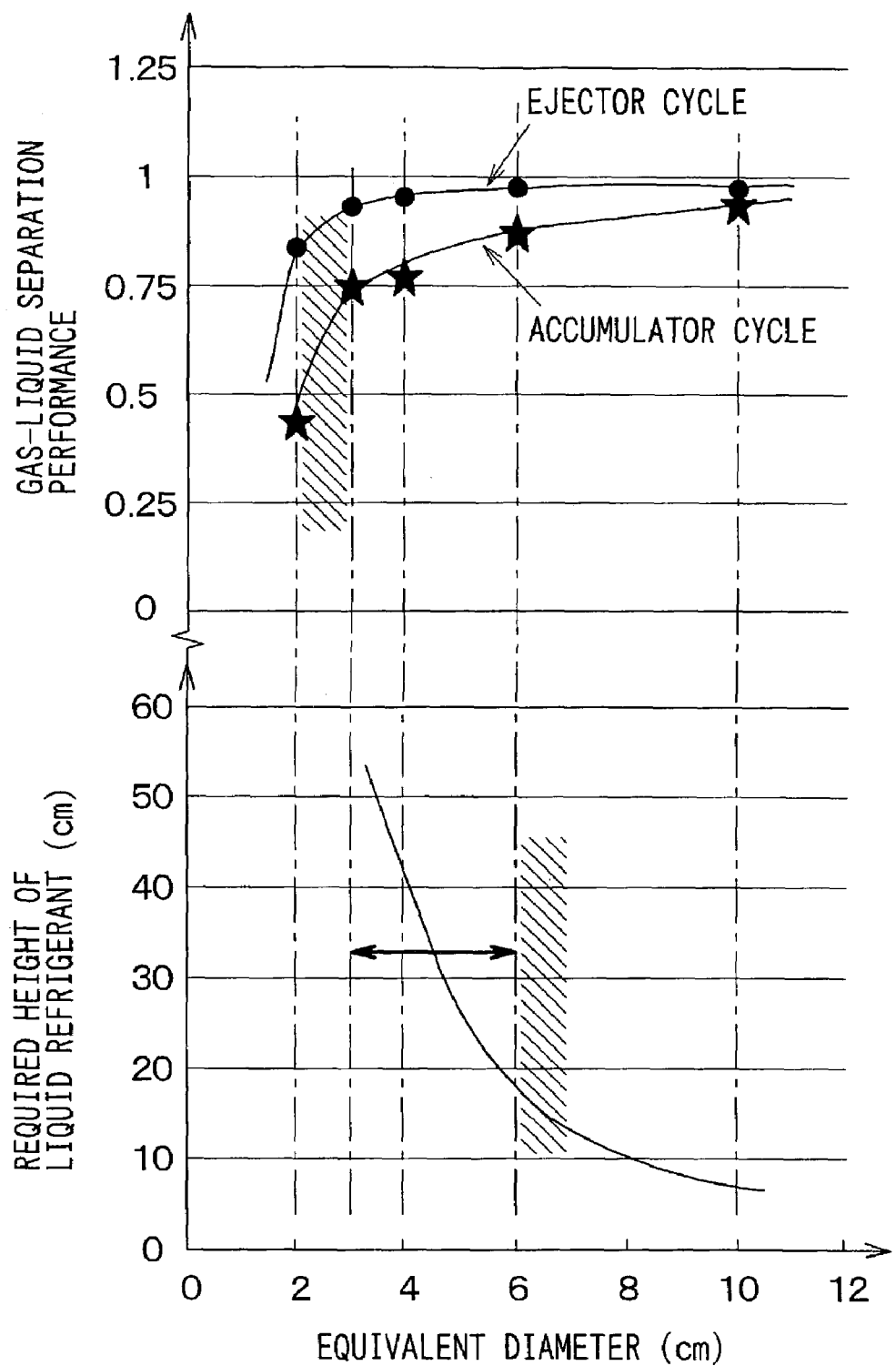
FIG. 5 is a graph showing a relationship between an equivalent inner diameter of the gas-liquid separator, gas-liquid separation performance, and a required height of liquid refrigerant stored in the gas-liquid separator, according to the first embodiment.

Further, in a case where carbon dioxide is used as the refrigerant, when liquid refrigerant of 500 cubic centimeter (cc) is stored in the gas-liquid separator 50, gas-liquid separation performance is studied in an ejector refrigerant cycle and a normal accumulator cycle. This experimental results are shown in FIG. 5. In the normal accumulator cycle, refrigerant is decompressed in iso-enthalpy by a decompression device such as an expansion valve and a capillary tube, without using an ejector. In the normal accumulator cycle, as the equivalent inner diameter of the tank body 51 reduces, the gas-liquid separation performance is reduced, and evaporation performance of the evaporator is reduced. Therefore, liquid refrigerant may flow into the compressor.

However, in the ejector refrigerant cycle, the gas-liquid separator 50 can be formed into a size required to be suitably mounted in a vehicle while its gas-liquid separation performance is not reduced. Specifically, when the ratio (H/D) of the height H to the equivalent inner diameter D of the tank body 51 is set larger than 1 while the equivalent inner diameter D is in a range of 2 cm and 6 cm, it can prevent the gas-liquid separation performance from being largely reduced while the wall thickness of the tank body 51 can be effectively reduced. Further, when the ratio (H/D) of the height H to the equivalent inner diameter D of the tank body 51 is set in the range of 6.66 and 13.3 while the equivalent inner diameter D is set in the range of 2 cm and 6 cm, the gas-liquid separation performance of the gas-liquid separator 50 can be improved, and the size of the gas-liquid separator 50 can be effectively reduced. For example, when the height H of the gas-liquid separator is 30 cm, and its equivalent inner diameter is 6 cm or smaller, the ratio (H/D) of the height to the equivalent inner diameter of the tank body 51 can be set smaller than 13.3. In this case, even when the inner volume of the gas-liquid separator 50 is set at 500 CC, the gas-liquid separation performance of the gas-liquid separator 50 is not reduced by reducing the equivalent inner diameter D of the tank body 51.

As shown in FIG. 5, when the equivalent inner diameter D of the tank body 51 is set in a range of 3 cm and 6 cm, the gas-liquid separation performance of the gas-liquid separator 50 can be further improved. Further, the ratio (H/D) of the height H to the equivalent inner diameter D of the tank body 51 can be set at a suitable value larger than 1, in accordance the volume of liquid refrigerant in the tank body 51, the refrigerant state and the ejector performance and the like.

(Second Embodiment)

Figure 6A:
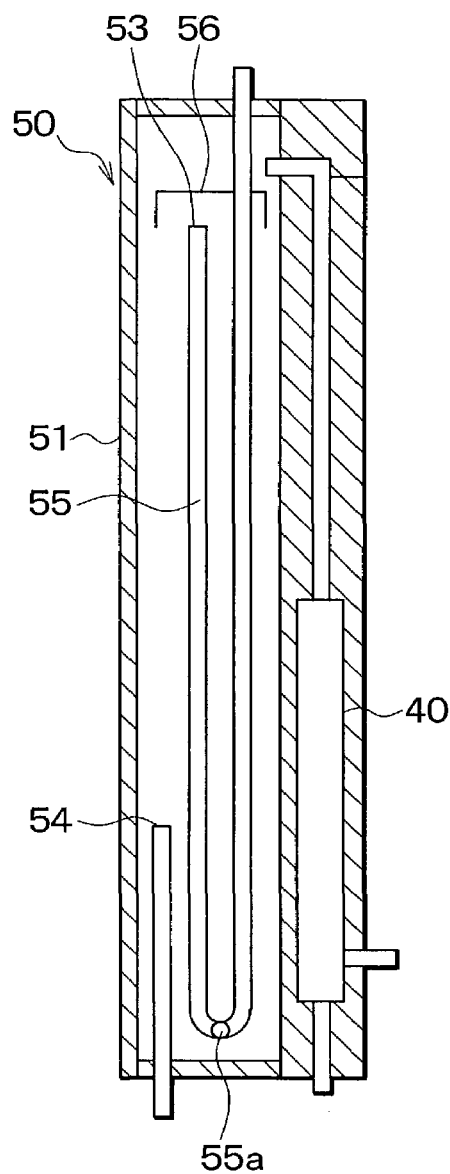
FIG. 6A is a longitudinal sectional view showing a gas-liquid separator according to a second embodiment of the present invention.
Figure 6B:
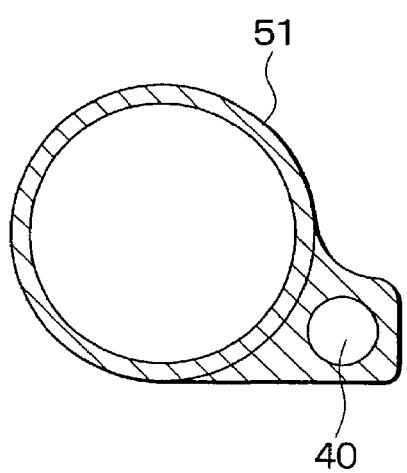
FIG. 6B is a lateral sectional view showing the gas-liquid separator according to the second embodiment.

In the second embodiment, as shown in FIGS. 6A, 6B, a container for containing the ejector 40 is molded integrally with the tank body 51 by extrusion or drawing, so that at least a part of the ejector 40 is integrated to the gas-liquid separator 50. In the second embodiment, the nozzle, the mixing portion and the diffuser of the ejector 40 are arranged in a direction parallel to the longitudinal direction of the tank body 51. Therefore, the gas-liquid separator 50 and the ejector 40 can be readily integrated to each other. In the second embodiment, the other parts are similar to those of the above-described first embodiment, and the advantage described in the first embodiment can be obtained.

(Third Embodiment)

Figure 7A:
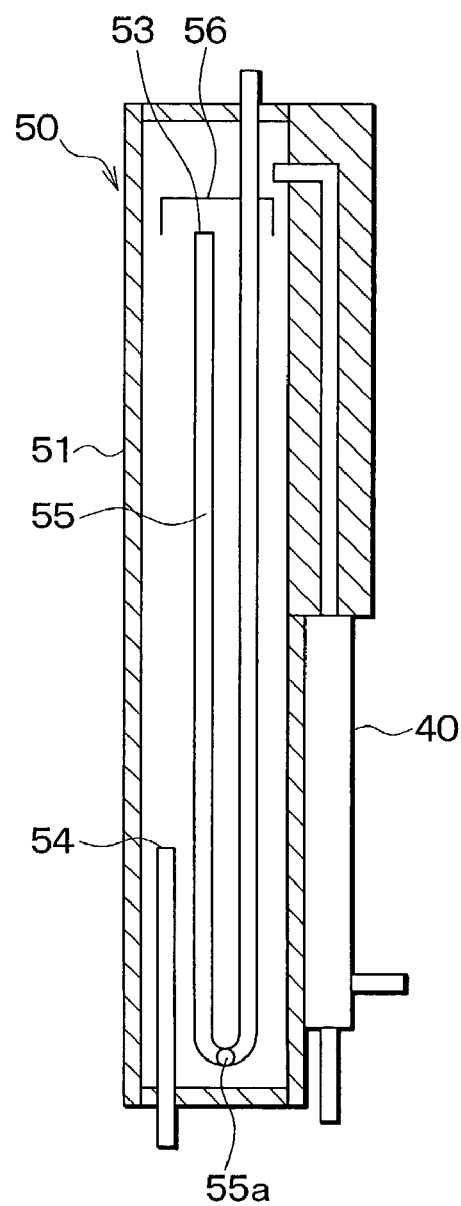
FIG. 7A is a longitudinal sectional view showing a gas-liquid separator according to a third embodiment of the present invention.
Figure 7B:
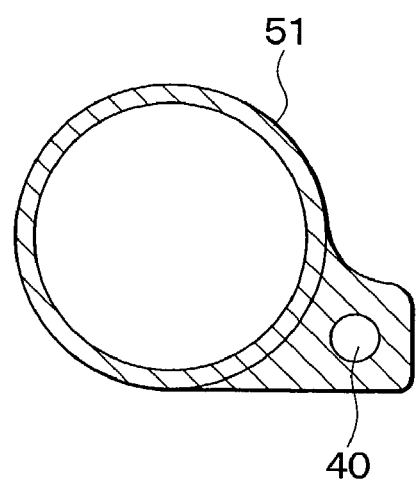
FIG. 7B is a lateral sectional view showing the gas-liquid separator according to the third embodiment.

The third embodiment is a modification of the second embodiment. As shown in FIGS. 7A, 7B, pipes for connecting the ejector 40 and the gas-liquid separator 50 or a part of the container for containing the ejector are molded integrally with the tank body 51 by extrusion or drawing, so that at least a part of the ejector 40 is integrated to the gas-liquid separator 50. In the third embodiment, the other parts are similar to those of the above-described second embodiment.

(Fourth Embodiment)

Figure 8A:
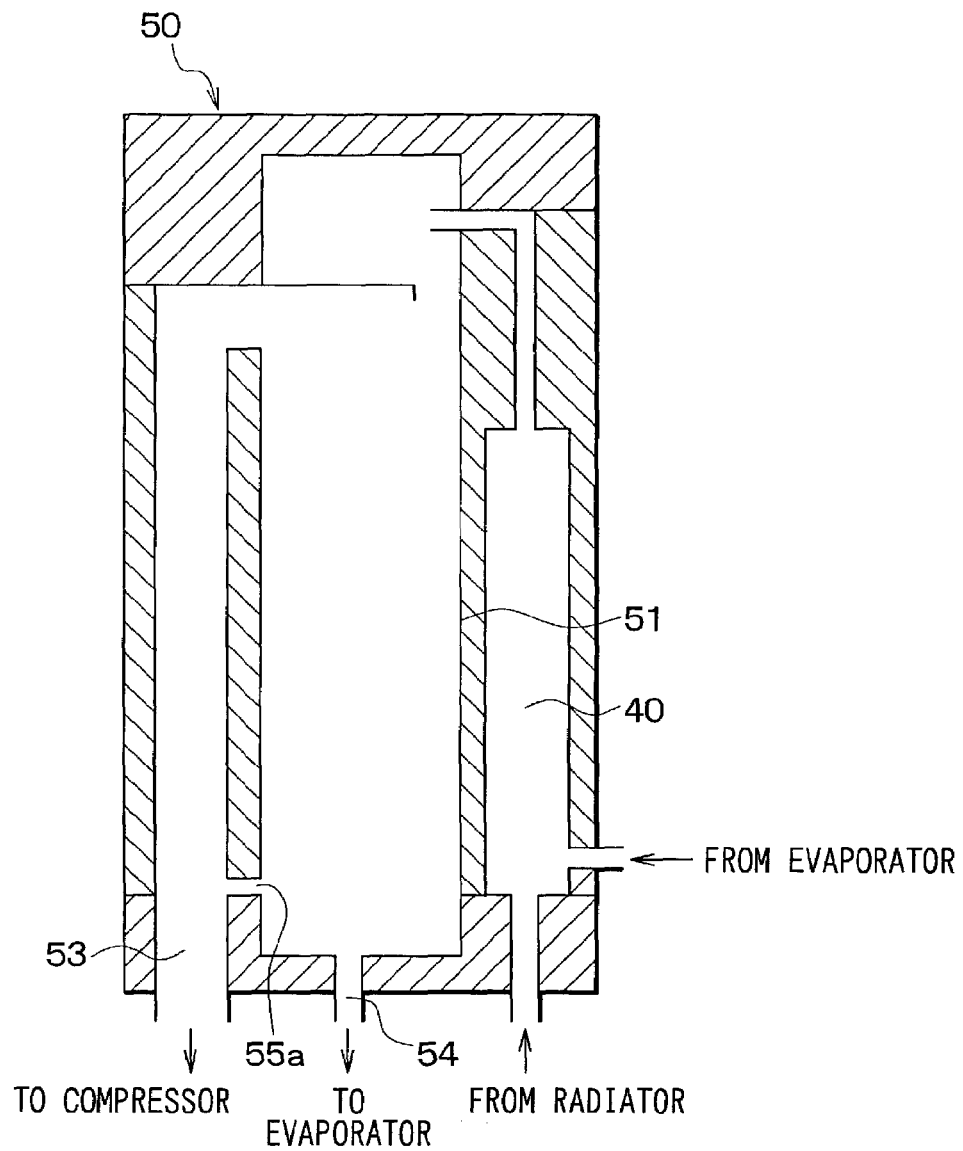
FIG. 8A is a longitudinal sectional view showing a gas-liquid separator according to a fourth embodiment of the present invention.
Figure 8B:
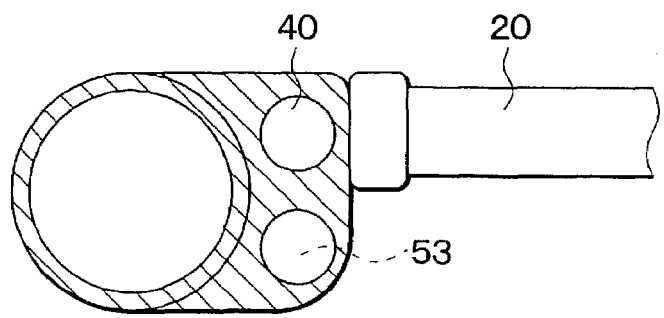
FIG. 8B is a lateral sectional view showing the gas-liquid separator according to the fourth embodiment.

In the gas-liquid separator 50 of above-described first embodiment, a refrigerant passage connected to the gas refrigerant outlet 53 and a refrigerant passage connected to the liquid refrigerant outlet 54 are constructed of pipe members. However, in the fourth embodiment, as shown in FIGS. 8A, 8B, the refrigerant passages connected to the refrigerant outlets 53, 54 are defined in the tank body 51.

In the fourth embodiment, the other parts are similar to those of the above-described first embodiment, and the advantage described in the first embodiment can be obtained.

(Fifth Embodiment)

Figure 9:
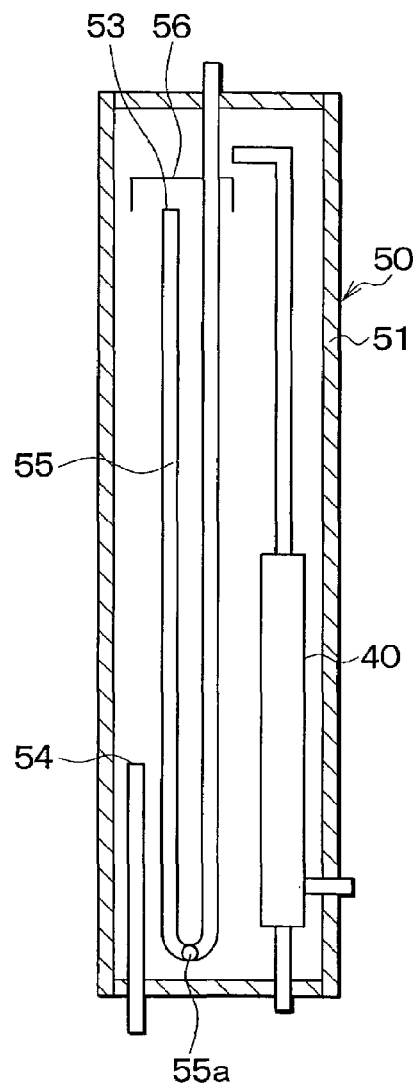
FIG. 9 is a longitudinal sectional view showing a gas-liquid separator according to a fifth embodiment of the present invention.

In the fifth embodiment, as shown in FIG. 9, the ejector 40 is disposed in the tank body 51. Even in this case, the nozzle, the mixing portion and the diffuser of the ejector 40 are arranged in the longitudinal direction of the gas-liquid separator 50.

In the fifth embodiment, the other parts are similar to those of the above-described first embodiment, and the advantage described in the first embodiment can be obtained.

(Sixth Embodiment)

Figure 10:
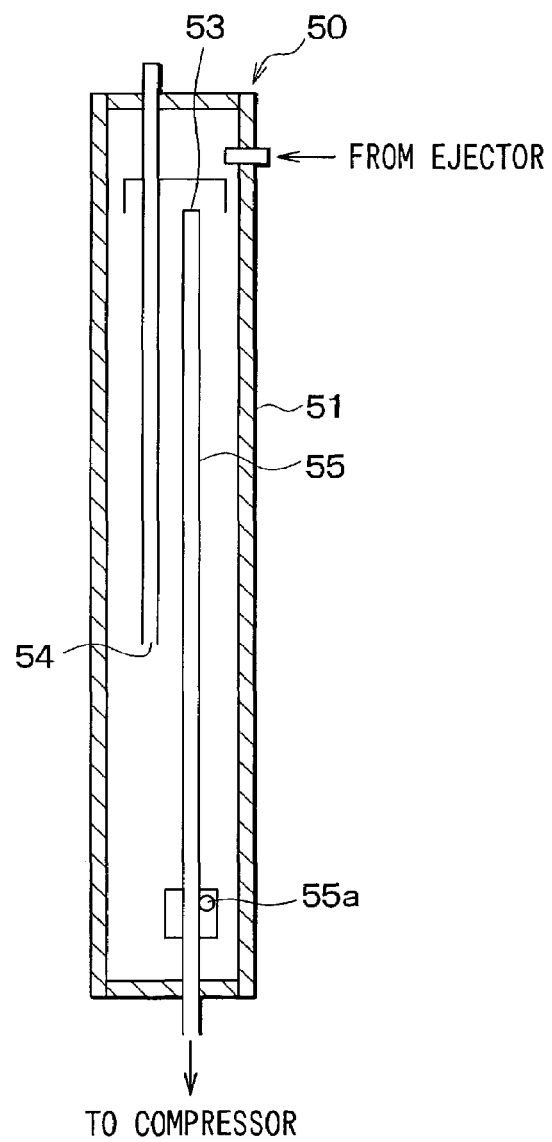
FIG. 10 is a longitudinal sectional view showing a gas-liquid separator according to a sixth embodiment of the present invention.

In the gas-liquid separator 50 of the above-described first embodiment, the pipe 55 connected to the gas refrigerant outlet 53 is formed in the U-shape. However, in the fifth embodiment, as shown in FIG. 10, the pipe 55 is linearly formed.

In the sixth embodiment, the other parts are similar to those of the above-described first embodiment, and the advantage described in the first embodiment can be obtained.

(Other Embodiments)

In the above embodiments, the ratio H/D of the vertical inner dimension H to the equivalent inner diameter D of the tank body 51 is set to be larger than 1. Further, in order to effectively reducing the size of the tank body 51, the ratio H/D of the tank body 51 is set in the range between 6.66 and 13.3 (i.e., $6.66 \leq H/D \leq 13.3$). However, when the equivalent inner diameter D of the tank body 51 is in the range of 2 cm–6 cm, the ratio H/D is not limited to this range, and can be set at a value larger than 1. For example, when the equivalent inner diameter D of the tank body 51 is set in the range of 2 cm–6 cm, the ratio H/D of the tank body 51 can be set such that $1<H/D$, $6.66 \leq H/D$, $1<H/D \leq 13.3$, $1.41<H/D$, $1<H/D<5.66$, $1.41<H/D<5.66$, or $4.86 \leq H/D$.

In the above-described embodiments, refrigerant may be a natural refrigerant such as nitrogen, a HFC group refrigerant, a HFE group refrigerant or a mixture thereof, without being limited to carbon dioxide.

In the above-described embodiments, the present invention is typically applied to the vehicle air conditioner. However, the present invention is not limited to the vehicle air conditioner.

In the above-described embodiments, the header 23, the gas-liquid separator 50 and the ejector 40 are integrated to each other as one body. However, the present invention is not limited to this structure. For example, the present invention can be applied to an ejector refrigerant cycle where the header 23 of the radiator 20, the gas-liquid separator 50 and the ejector 40 are disposed to be separated from each other. Further, the present invention can be applied to an ejector refrigerant cycle where at least one of the header 23 of the radiator 20, the gas-liquid separator 50 and the ejector 40 is formed separately from the other one thereof.

Such changes and modifications are to be understood as being within the scope of the present invention as defined by the appended claims.

What is claimed is:

1. A gas-liquid separator for a refrigerant cycle, the refrigerant cycle including: a compressor for compressing refrigerant; a radiator which cools refrigerant discharged from the compressor; an evaporator for evaporating refrigerant; and an ejector including a nozzle for converting a pressure energy of high-pressure refrigerant from the radiator to a speed energy so that the high-pressure refrigerant is decompressed and expanded and gas refrigerant evaporated in the evaporator is sucked, and a pressure-increasing portion in which the speed energy is converted to the pressure energy so that the pressure of refrigerant is increased while refrigerant discharged from the nozzle and the gas refrigerant from the evaporator are mixed, the gas-liquid separator comprising
- a tank body for separating refrigerant, flowing from the ejector, into gas refrigerant and liquid refrigerant,
- an inlet which opens at an upper region of an inner hollow chamber in the tank body and is connected with an outlet of the ejector directly to introduce the gas-liquid two phase refrigerant into the inner hollow chamber;
- a first outlet which opens at an upper region of the inner hollow chamber in the tank body but below the inlet and is connected with the compressor to enable the compressor to draw gaseous refrigerant from the inner hollow chamber; and
- a second outlet which opens at a lower region of the inner hollow chamber in the tank body and is connected with the evaporator to enable the ejector to draw liquid refrigerant from the inner hollow chamber through the evaporator; wherein:
- the tank body is disposed such that the gas refrigerant in the tank body is supplied to a suction side of the compressor and the liquid refrigerant in the tank body is supplied to the evaporator;
- the tank body has an equivalent inner diameter (D) that is set in a range of 2 cm–6 cm;
- a ratio of a vertical dimension (H) of the tank body to the equivalent inner diameter (D) thereof is larger than 1;
- the outlet of the ejector is coupled to the tank body at a portion above the upper surface of the liquid refrigerant therein; and
- the inlet is provided on an end of a passage which directs the refrigerant introduced into the inner hollow chamber via the inlet with a horizontal direction component.

2. The gas-liquid separator according to claim 1, wherein the tank body substantially has a cylindrical shape.

3. The gas-liquid separator according to claim 1, wherein the ratio of the vertical dimension (H) of the tank body to the equivalent inner diameter (D) thereof is equal to or larger than 6.66.

4. The gas-liquid separator according to claim 1, wherein the ratio of the vertical dimension (H) of the tank body to the equivalent inner diameter (D) thereof is equal to or smaller than 13.3.

5. The gas-liquid separator according to claim 1, wherein the ratio of the vertical dimension (H) of the tank body to the equivalent inner diameter (D) thereof is set in a range between 6.66 and 13.3.

6. The gas-liquid separator according to claim 1, wherein the ratio of the vertical dimension (H) of the tank body to the equivalent inner diameter (D) thereof is equal to or larger than 1.41.

7. The gas-liquid separator according to claim 1, wherein the ratio of the vertical dimension (H) of the tank body to the equivalent inner diameter (D) thereof is smaller than 5.66.

8. The gas-liquid separator according to claim 1, wherein the ratio of the vertical dimension (H) of the tank body to the equivalent inner diameter (D) thereof is set in a range between 1.41 and 5.66.

9. The gas-liquid separator according to claim 1, wherein the ratio of the vertical dimension (H) of the tank body to the equivalent inner diameter (D) thereof is equal to or larger than 4.86.

10. The gas-liquid separator according to claim 1, wherein the tank body is integrated to the radiator.

11. The gas-liquid separator according to claim 1, wherein the tank body is integrated to the ejector.

12. The gas-liquid separator according to claim 1, wherein the tank body is disposed adjacent to the radiator in a direction perpendicular to a vertical direction of the tank body.

13. The gas-liquid separator according to claim 1, wherein the tank body has a gas refrigerant outlet from which the gas refrigerant in the tank body is directly introduced to the compressor.

14. The gas-liquid separator according to claim 1, wherein the refrigerant discharged from the outlet of the ejector to the tank body becomes in a gas-liquid two-phase state or a saturation vapor state.

15. The gas-liquid separator according to claim 1, wherein the tank has a vertical axis longer than a horizontal axis and comprises:
- a partition plate supported in the tank for preventing direct refrigerant flow path from the inlet to the first outlet through the inner hollow chamber.

16. The gas-liquid separator according to claim 15, wherein the partition plate provides a horizontally extending partition between the inlet and the first outlet and defines a refrigerant passage along an inner wall of the tank to enable the refrigerant to flow from the upper region to the lower region.

17. The gas-liquid separator according to claim 16, wherein the tank is supported on a side of a header tank of a heat dissipating heat exchanger and is formed with a vertical height similar to a vertical height of the heat dissipating heat exchanger.

18. A gas-liquid separator for a refrigerant cycle, the refrigerant cycle including: a compressor for compressing refrigerant; a radiator which cools refrigerant discharged from the compressor; an evaporator for evaporating refrigerant; and an ejector including a nozzle for converting a pressure energy of high-pressure refrigerant from the radiator to a speed energy so that the high-pressure refrigerant is decompressed and expanded and gas refrigerant evaporated in the evaporator is sucked, and a pressure-increasing portion in which the speed energy is converted to the pressure energy so that the pressure of refrigerant is increased while refrigerant discharged from the nozzle and the gas refrigerant from the evaporator are mixed, the gas-liquid separator comprising
- a tank body for separating refrigerant, flowing from the ejector, into gas refrigerant and liquid refrigerant, wherein:
- the tank body is disposed such that the gas refrigerant in the tank body is supplied to a suction side of the compressor and the liquid refrigerant in the tank body is supplied to the evaporator;
- the tank body has an equivalent inner diameter (D) that is set in a range of 2 cm–6 cm;
- a ratio of a vertical dimension (H) of the tank body to the equivalent inner diameter (D) thereof is larger than 1; and
- at least a part of the ejector is molded integrally with the tank body by one of extrusion and drawing.

19. An ejector refrigerant cycle comprising:
- a compressor for compressing refrigerant;
- a radiator which cools refrigerant discharged from the compressor;
- an evaporator for evaporating refrigerant;
- an ejector including a nozzle for converting a pressure energy of high-pressure refrigerant from the radiator to a speed energy so that the high-pressure refrigerant is decompressed and expanded and gas refrigerant evaporated in the evaporator is sucked, and a pressure-increasing portion in which the speed energy is converted to the pressure energy so that the pressure of refrigerant is increased while refrigerant discharged from the nozzle and the gas refrigerant from the evaporator are mixed;

a gas-liquid separator including a tank body for separating refrigerant, flowing from the ejector, into gas refrigerant and liquid refrigerant, an inlet which opens at an upper region of an inner hollow chamber in the tank body and is connected with an outlet of the ejector directly to introduce the gas-liquid two phase refrigerant into the inner hollow chamber;

a first outlet which opens at an upper region of the inner hollow chamber in the tank body but below the inlet and is connected with the compressor to enable the compressor to draw gaseous refrigerant from the inner hollow chamber; and a second outlet which opens at a lower region of the inner hollow chamber in the tank body and is connected with the evaporator to enable the ejector to draw liquid refrigerant from the inner hollow chamber through the evaporator; wherein:

the gas-liquid separator is disposed such that the gas refrigerant in the tank body is supplied to a suction side of the compressor and the liquid refrigerant in the tank body is supplied toward the evaporator;

the tank body has an equivalent inner diameter (D) that is set in a range of 2 cm–6 cm;

the outlet of the ejector is coupled to the tank body at a portion above the upper surface of the liquid refrigerant therein; and the inlet is provided on an end of a passage which directs the refrigerant introduced into the inner hollow chamber via the inlet with a horizontal direction component.

20. The ejector refrigerant cycle according to claim 19, wherein the tank body is disposed adjacent to the radiator in a direction perpendicular to a vertical direction of the tank body.

21. The ejector refrigerant cycle according to claim 19, wherein a ratio of a vertical dimension (H) of the tank body to the equivalent inner diameter (D) thereof is set to be larger than 1.

22. The ejector refrigerant cycle according to claim 21, wherein the ratio of the vertical dimension (H) of the tank body to the equivalent inner diameter (D) thereof is equal to or smaller than 13.3.

23. The ejector refrigerant cycle according to claim 19, wherein a ratio of a vertical dimension (H) of the tank body to the equivalent inner diameter (D) thereof is set in a range between 6.66 and 13.3.

24. The ejector refrigerant cycle according to claim 19, wherein a ratio of a vertical dimension (H) of the tank body to the equivalent inner diameter (D) thereof is set in a range between 1.41 and 5.66.

25. The ejector refrigerant cycle according to claim 19, wherein a ratio of a vertical dimension (H) of the tank body to the equivalent inner diameter (D) thereof is equal to or larger than 4.86.

26. The ejector refrigerant cycle according to claim 19, wherein the refrigerant is any one of carbon dioxide, natural refrigerant, HFC group refrigerant and HFE group refrigerant.

27. The ejector refrigerant cycle according to claim 19, wherein the tank body has a gas refrigerant outlet from which the gas refrigerant in the tank body is directly introduced to the compressor.

28. The ejector refrigerant cycle according to claim 19, wherein the refrigerant discharged from the outlet of the ejector to the tank body becomes in a gas-liquid two-phase state or a saturation vapor state.

* * * * *